United States Patent
Thoen (10) Patent No.: US 9,905,241 B2
(45) Date of Patent: Feb. 27, 2018

(54) METHOD AND APPARATUS FOR VOICE COMMUNICATION USING WIRELESS EARBUDS

(71) Applicant: NXP B.V., Eindhoven (NL)

(72) Inventor: Steven Mark Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/173,138

(22) Filed: Jun. 3, 2016

(65) Prior Publication Data
US 2017/0352360 A1    Dec. 7, 2017

(51) Int. Cl.
| | |
|---|---|
| H04R 5/00 | (2006.01) |
| G10L 21/02 | (2013.01) |
| H04R 1/32 | (2006.01) |
| H04R 3/04 | (2006.01) |

(52) U.S. Cl.
CPC .............. *G10L 21/02* (2013.01); *H04R 1/326* (2013.01); *H04R 3/04* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 6,594,630 | B1 | 7/2003 | Zlokarnik et al. |
| 7,995,771 | B1 | 8/2011 | Faltys et al. |
| 2006/0073787 | A1 | 4/2006 | Lair et al. |
| 2008/0044036 | A1 | 2/2008 | Konchitsky |
| 2008/0280653 | A1 | 11/2008 | Ma et al. |
| 2009/0238377 | A1 | 9/2009 | Ramakrishnan et al. |
| 2012/0008807 | A1* | 1/2012 | Gran .................... H04R 25/407 381/313 |
| 2014/0050454 | A1 | 2/2014 | Slotte |
| 2014/0170979 | A1 | 6/2014 | Samanta Singhar |
| 2014/0270231 | A1 | 9/2014 | Dusan et al. |

(Continued)

FOREIGN PATENT DOCUMENTS

| | | |
|---|---|---|
| WO | WO-03/083828 A1 | 10/2003 |
| WO | WO-2007/073818 A1 | 7/2007 |

OTHER PUBLICATIONS

Lotter, Thomas, Ulrich Schatzle, and Thomas Fischer. "e2e 3.0—energy efficient inter-aural audio transmission." Siemens.com, 2014.*

(Continued)

*Primary Examiner* — Joseph Saunders, Jr.
*Assistant Examiner* — James Mooney (57) ABSTRACT

One example discloses an apparatus for voice communication, including: a first wireless device including a first pressure sensor having a first acoustical profile and configured to capture a first set of acoustic energy within a time window; wherein the first wireless device includes a near-field magnetic induction (NFMI) signal input; wherein the first wireless device includes a processing element configured to: receive, through the NFMI signal input, a second set of acoustic energy captured by a second pressure sensor, having a second acoustical profile, within a second wireless device and within the time window; apply a signal enhancement technique to the first and second sets of acoustic energy based on the first and second acoustical profiles; and output an enhanced voice signal based on applying the signal enhancement.

15 Claims, 7 Drawing Sheets

(56) References Cited

U.S. PATENT DOCUMENTS

2015/0163602 A1* 6/2015 Pedersen .............. H04R 25/554
                                                381/315
2015/0199977 A1* 7/2015 Ungstrup ............... H04R 25/55
                                                704/260

OTHER PUBLICATIONS

NXP B.V., Thoen, Steven Mark; U.S. Appl. No. 15/172,493 not yet published; 33 pages (Jun. 3, 2016).
NXP, B.V., Thoen, Steven Mark; "Sound Signal Detector"; U.S. Appl. No. 15/172,493 not yet published; 33 pages (Jun. 3, 2016).
NXP; "NXP NFMI radio NxH2280—NFMI radio for wireless audio and data streaming"; retrieved from the internet Apr. 28, 2016 http://www.nxp.com/documents/leaflet/75017645.pdf; 2 pages (2015).
Wikipedia; "Beamforming" retrieved from the internet https://en.wikipedia.org/wiki/Beamforming on Jun. 3, 2016; 6 pages (Jun. 3, 2016).

* cited by examiner

METHOD AND APPARATUS FOR VOICE COMMUNICATION USING WIRELESS EARBUDS

The present specification relates to systems, methods, apparatuses, devices, articles of manufacture and instructions for voice communication.

SUMMARY

According to an example embodiment, an apparatus for voice communication, comprising: a first wireless device including a first pressure sensor having a first acoustical profile and configured to capture a first set of acoustic energy within a time window; wherein the first wireless device includes a near-field magnetic induction (NFMI) signal input; wherein the first wireless device includes a processing element configured to: receive, through the NFMI signal input, a second set of acoustic energy captured by a second pressure sensor, having a second acoustical profile, within a second wireless device and within the time window; apply a signal enhancement technique to the first and second sets of acoustic energy based on the first and second acoustical profiles; and output an enhanced voice signal based on applying the signal enhancement.

In another example embodiment, the signal enhancement technique is a beamforming technique.

In another example embodiment, the signal enhancement technique includes multiple beamforming operations targeted to individually isolate a set of voice signals; and multiple enhanced voice signals are output based on the isolated set of different voice signals.

In another example embodiment, the processing element is further configured to: search for an un-enhanced voice signal in the first set of acoustic energy; and inactivate the receive, apply and output elements until the un-enhanced voice signal is detected in the first set of acoustic energy.

In another example embodiment, the second set of acoustic energy is not received by the first wireless device until the first wireless device requests transfer of the second set of acoustic energy; and the first wireless device is configured to request transfer of the second set of acoustic energy in response to the processing element detecting an un-enhanced voice signal in the first set of acoustic energy.

In another example embodiment, the processing element is configured to: calculate a probability that the first set of acoustic energy received within the time window includes the un-enhanced voice signal and only request transfer of the second set of acoustic energy if the calculated probability is above a predetermined threshold probability.

In another example embodiment, a voice activity algorithm enables the search for the un-enhanced voice signal.

In another example embodiment, the second wireless device is configured to be separated from the first wireless device by a predetermined distance.

In another example embodiment, the set of wireless devices are configured to be separated by the predetermined distance within at least one of: an indoor environment, a home, an office, a subway, a vehicle, a car, a train, a plane, or an outdoor environment.

In another example embodiment, the wireless devices include at least one of: a microphone, a earbud, a hearable, a smartphone, a smartwatch, a wearable device, a tablet or a computer.

In another example embodiment, the processing element configured to initiate a set of voice communication actions configured to analyze the enhanced voice signal for at least one of: a voice command, a set of words, or a voice signature.

In another example embodiment, the processing element configured to initiate a set of voice communication actions configured to use the enhanced voice signal to perform at least one of: natural language processing, isolating a set of voice signals from within a larger set of voice signals, or improving a voice signal quality.

In another example embodiment, the processing element configured to initiate a wireless connection to a voice signal processing server; and the server performs the set of voice communication actions.

In another example embodiment, the first pressure sensor is configured to receive the acoustic energy via a passage coupling an internal portion of the wireless device to an external ambient environment.

According to an example embodiment, an article of manufacture including at least one non-transitory, tangible machine readable storage medium containing executable machine instructions for voice communication: wherein the article includes, a wireless device including a pressure sensor, having a first acoustical profile, and configured to capture a first set of acoustic energy within a time window, and a processing element configured to execute the instructions; and wherein the instructions include, receiving, through an near-field magnetic induction (NFMI) signal input, a second set of acoustic energy captured by a second pressure sensor, having a second acoustical profile, within a second wireless device and within the time window; applying a signal enhancement technique to the first and second sets of acoustic energy based on the first and second acoustical profiles; and outputting an enhanced voice signal based on applying the signal enhancement.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices, such as wireless earbuds (also known as Hearables), in various embodiments include embedded voice, sound and sensor capabilities. Such wireless devices can be designed to support playback of stereo sound from an external device such as a cellphone, making phone calls, responding to voice commands, detecting sound events, and so on.

Some example embodiments communicate with a smartphone or other devices, such as tablet, computers, etc., through Bluetooth Classic or through Bluetooth Low Energy (BLE), and communicate with each other using Near-Field Magnetic Induction (NFMI) signals that can pass through various structures, including the human body, and in the case of hearables, through the human head.

While one example embodiment for such wireless devices is voice communication, when a single microphone at one earbud (e.g. a single-sided microphone) is used to pick up the voice of the wearer, sound quality is limited since the single-sided microphone is not directional, and stray environmental noise can obfuscate the desired speech signal.

Another example embodiment for voice communication may use two microphones in a single earbud device in an attempt to improve the directionality of the combined microphone signal, suppress environmental noise and increase a level of the speech signal. However, due to the close proximity of such microphones, the amount of achievable environment noise suppression is limited.

An improved voice communication device could help further reduce ambient noise, improve speech recognition and identify voice commands.

Figure 1:
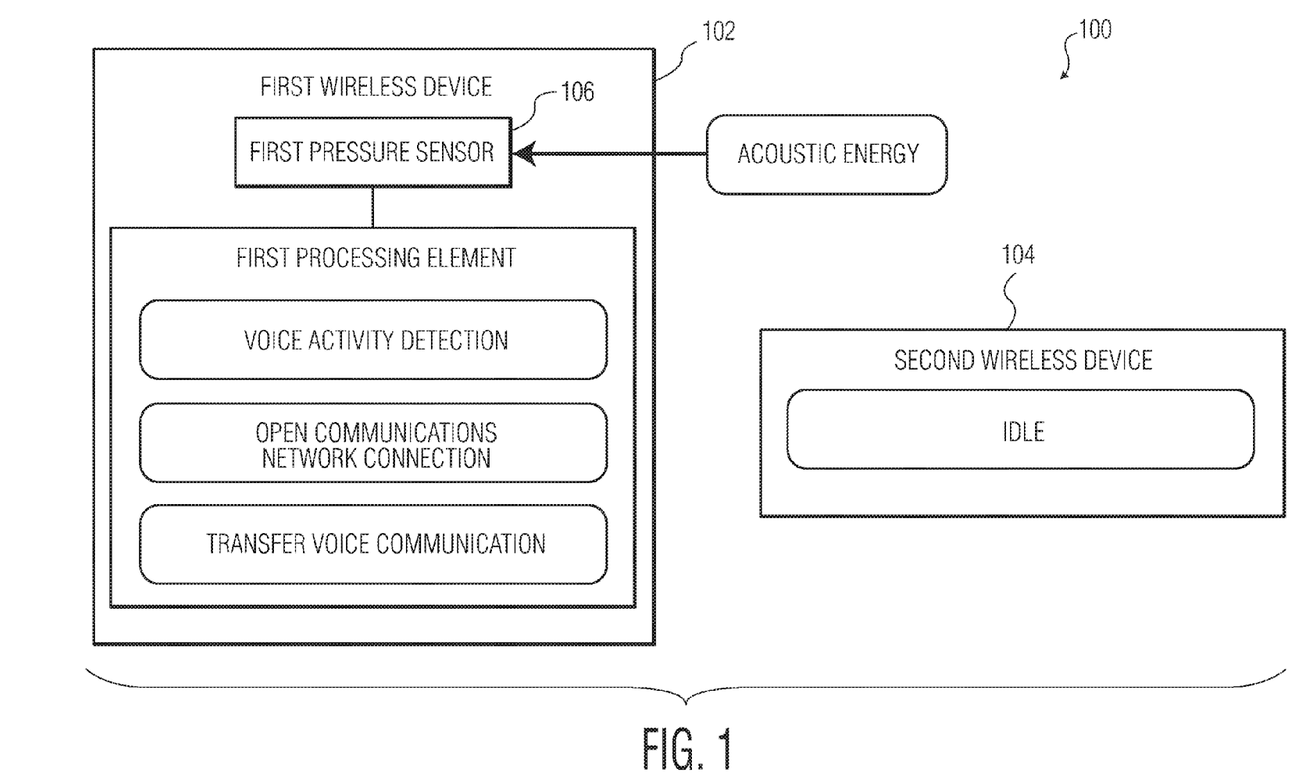
FIG. 1 is a first example apparatus for voice communication.

FIG. 1 is a first example apparatus 100 for voice communication. The first apparatus 100 shows a single-sided voice communication apparatus that includes: a first wireless device 102 (e.g. left earbud, master earbud, etc.) and a second wireless device 104 (e.g. right earbud).

In single-sided voice communication, the first wireless device 102 (e.g. master earbud) includes a connection to a cloud network, through a smartphone or other device and effects voice communication based on a first pressure sensor 106 (e.g. local microphone) signal.

In one example, voice communication of and/or speech recognition within the first apparatus 100 is achieved using a power-optimized, multi-stage process where initially the first wireless device 102 (e.g. master earbud) aims to individually detect acoustic energy and then gradually apply more computational processing power to ensure that the detected sound is effectively a voice signal emanating from its wearer.

Once the first wireless device 102 (e.g. master earbud) decides it has correctly detected voice activity from its wearer, it will establish a voice call over a communications services network. In some example embodiments, additional processing may further interpret the meaning and intent of the voice signal information. The right earbud 104 is passive during the voice communication and/or speech recognition process.

In one example of the first wireless device 102 (e.g. master earbud), the first apparatus 100 uses an external microphone (i.e. the first pressure sensor 106) to listen for a user's voice. The external microphone however can pick up a lot of interfering sounds and other voices from the surroundings. This setup can lead to a poor voice communication signal and/or garbled speech recognition results.

In another example, the first wireless device 102 (e.g. master earbud) in the first apparatus 100 uses an internal microphone (i.e. the first pressure sensor 106) wholly located within the master earbud 102 to listen for a user's voice. In this case, while the internal microphone can be well isolated from surrounding noise sources (assuming a tight fitting earbud) and may not pick up a lot of interfering sounds and other voices from the surroundings, the microphone's signal is further attenuated and a user's high frequency speech content tends to be missing. Use of an internal microphone also can pick up unwanted interference when music or speech is played back through the first wireless device's 102 (e.g. master earbud's) speaker.

Figure 2A:
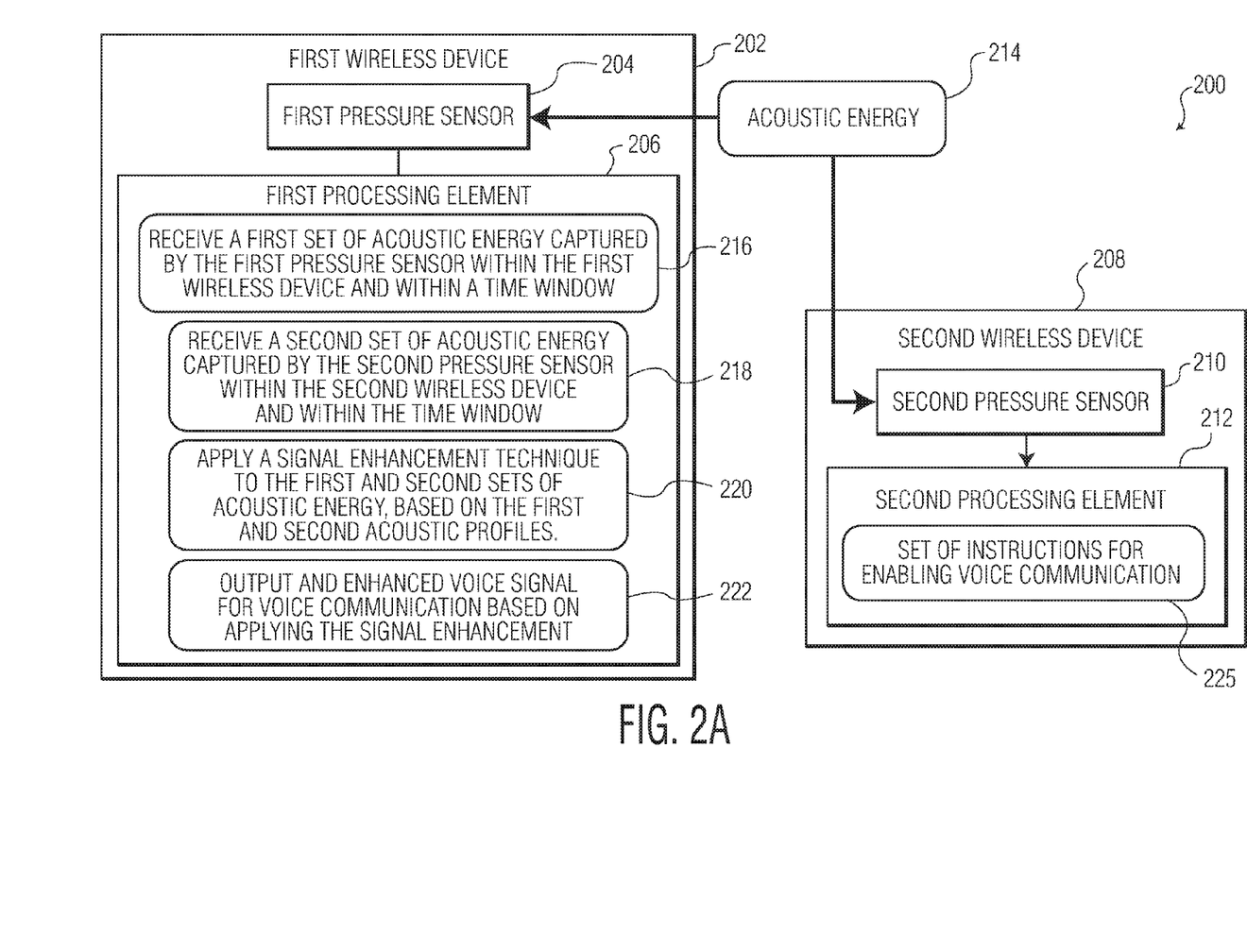
FIG. 2A is a second example apparatus for voice communication.

FIG. 2A is a second example 200 apparatus for voice communication. The second apparatus 200 includes: a first wireless device 202 having a first pressure sensor 204 and a first processing element 206; and a second wireless device 208 having a second pressure sensor 210 and a second processing element 212. Each pressure sensor 204, 210 captures acoustic energy 214 within a time window. The time window can be controlled by a clock signal synchronized between the devices 202, 208. Acoustic energy is herein defined to include gas pressure variations in an environment. A sound (e.g. audio) signal is herein defined as a specific type of acoustic energy, such as: a voice signal, a baby crying, a fire alarm, leaking water, broken glass, shots fired, etc. A voice signal is a special type of sound signal and is herein defined as a subset of sound signals which are equivalent to human speech or human-like (e.g. synthetic speech) speech sounds, such as a person's or robot's voice.

The wireless devices 202, 208 need not be the same in all example embodiments. In one example embodiment, the wireless devices 202, 208 could be two earbuds configured to be worn by a person. In another example embodiment, the wireless devices 202, 208 could be a smartwatch and a smartphone configured to be carried or worn by a person. In yet another example embodiment, the wireless devices could be two or more devices positioned at various locations in a conference room. The wireless devices 202, 208 thus could be: an earbud, a hearable, a smartphone, a smartwatch, a wearable device, a tablet, a computer, a wireless microphone, etc.

The second example 200 apparatus stores an acoustic profile for each of the wireless devices 202, 208. The acoustic profile, in one example embodiment, provides resonance and attenuation characteristics that are very specific to the wireless devices 202, 208, and in some examples may be specific to a just particular set of the wireless devices 202, 208. These acoustic profiles enable more accurate signal enhancements (e.g. beamforming) during later voice communication and speech processing steps. In other example embodiments one or more of the wireless device's acoustic profiles could be generic.

The first and second wireless devices 202, 208 are separated from each other by a predetermined distance. Predetermined distance in one example refers to a particular spatial placement of the wireless devices 202, 208 such that the wireless devices 202, 208 are separated by a fixed, or in other embodiments a known variable (e.g. periodic, equation, set of data points) distance. Using NFMI, this predetermined distance can be between various portions of a user's body. However, if more than two wireless devices are used, each having a pressure sensor, then two could communicate with NFMI and the third wireless device could communicate using a different wireless protocol (e.g. BlueTooth, WiFi, etc.) and be positioned elsewhere within: a home, a car, an office, an indoor or outdoor environment, etc. Generally, the further spatially separated the pressure sensors 204, 210 (e.g. microphones) are, then the more accurate the voice signal processing and ambient noise reduction.

Beamforming (i.e. spatial filtering) in one example is a signal enhancement technique used in sensor arrays for directional signal transmission or reception. Beamforming is achieved by combining elements in a phased array in such a way that signals at particular angles experience constructive interference while others experience destructive interference. Beamforming is used to achieve spatial signal selectivity. Thus beamforming defines a particular geometry within a space containing acoustic energy, which excludes other geometries and creates a very directional acoustic energy capture technique (e.g. targeting a specific front and center location wherein a person's mouth is likely to be located, using a set of wireless earbuds that are presumed to be worn on the person's ears. In other example embodiments, adaptive beamforming is used to zero in on a previously unknown location of a voice target. Adaptive beamforming may first identify a specific voice profile before removing other unwanted sounds (e.g. noise) or background voices.

In one example embodiment, the pressure sensors 204, 210 are microphones. The pressure sensors 204, 210 can receive the acoustic energy 214 either internal to the wireless device 202, 208 or externally (see internal/external discussion above) through a passage coupling an internal portion of the wireless devices 202, 208 directly to an external ambient environment.

In various example embodiments, one or both processing elements 206, 212 are configured with a set of instructions for enabling voice communication. The order in which these example instructions are presented can be changed or selectively excluded in different example embodiments. Additionally, in some example embodiments certain instructions are implemented in parallel.

A first instruction 216 is for receiving a first set of acoustic energy captured by the first pressure sensor 204 within the first wireless device 202 and within a time window.

A second instruction 218 is for receiving a second set of acoustic energy captured by the second pressure sensor 210 within the second wireless device 208 and within the time window. The wireless devices 202, 208 are configured to communicate and exchange data using near-field magnetic induction (NFMI) circuits and protocols.

The second set of acoustic energy transferred to the first wireless device 202 can be either a set of real-time acoustic energy 214, if the wireless connection between the wireless devices 202, 208 can be set up sufficiently rapidly, or a buffered version of the acoustic energy 214 to compensate for a delay in setting up the wireless link.

A third instruction 220 applies a signal enhancement (e.g. beamforming) technique to the first and second sets of acoustic energy, based on the first and second acoustical profiles.

A fourth instruction 222 outputs an enhanced (e.g. beamformed) voice signal for voice communication based on applying the signal enhancement. Thus, since the received acoustic energy 214 often includes noise or other unwanted signals, signal enhancement techniques, such as beamforming, helps distinguish the noise from the voice signal.

In some example embodiments, the second wireless device 208 includes a second processing element 212 having a set of instructions for enabling voice communication 225 which is similar to those in the first processing element 206.

Figure 2B:
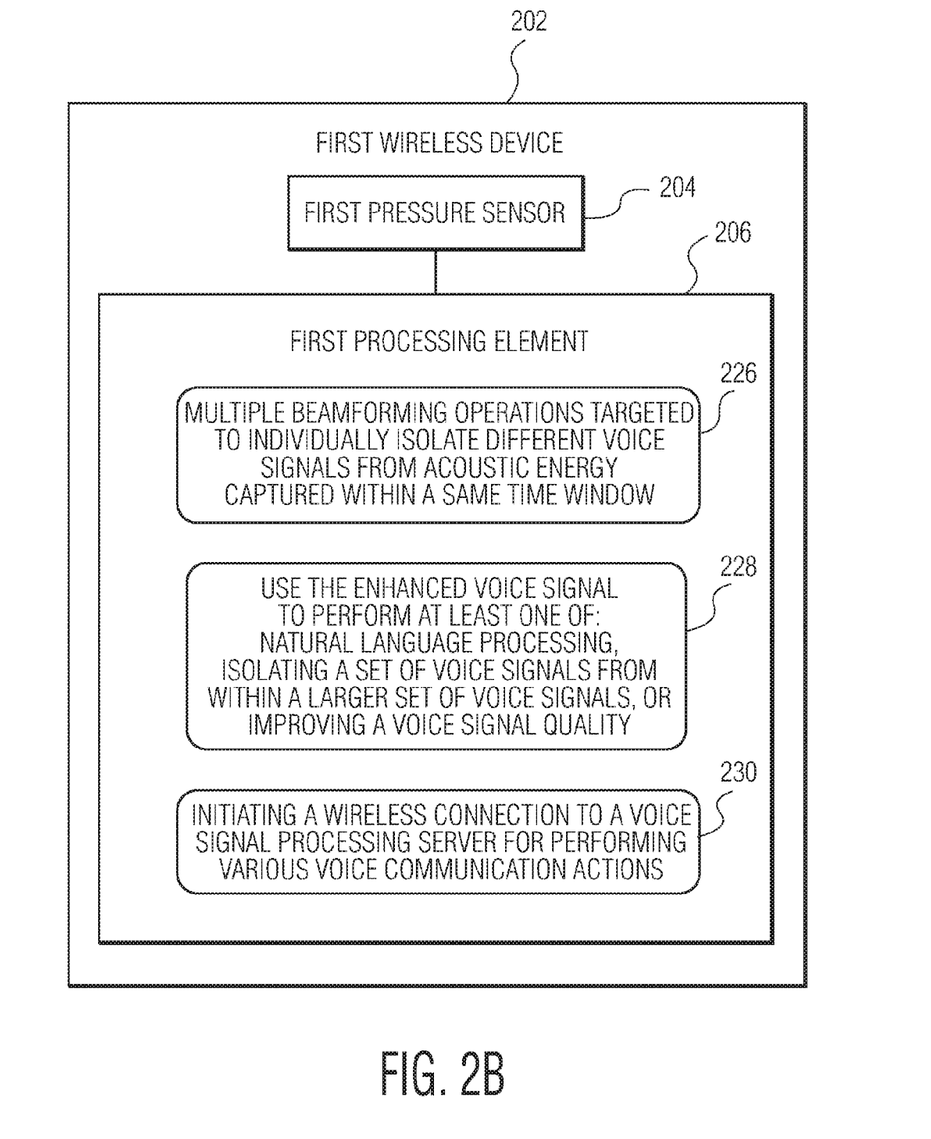
FIG. 2B is an example set of subsequent voice communication instructions for enabling voice communication.

FIG. 2B is an example set of subsequent voice communication instructions for enabling voice communication. In various example embodiments, one or both processing elements 206, 212 are configured with the set of subsequent voice communication instructions. The order in which these example instructions are presented can be changed or selectively excluded in different example embodiments. Additionally, in some example embodiments certain instructions are implemented in parallel.

A fifth instruction 226 includes multiple beamforming operations targeted to individually isolate different voice signals from acoustic energy captured within a same time window. Multiple enhanced voice signals would be output based on the isolated set of different voice signals such that several people talking at the same time could be resolved, processed and transmitted. For example, the multiple beamforming operations can help distinguish several people talking, each at slightly different locations with respect to the microphones.

An sixth instruction 228 initiates a set of voice communication actions configured to use the enhanced voice signal to perform at least one of: natural language processing, isolating a set of voice signals from within a larger set of voice signals, or improving a voice signal quality.

An seventh instruction 230 initiates a wireless connection to a voice signal processing server for performing various voice communication actions. Wireless device 202, 208 connections to the voice signal processing server (e.g. voice signal processing server) in one example can be through a Bluetooth connection to a smartphone which then has either a WIFI or cellular connection to a remote voice signal processing server.

In the second example 200 apparatus for voice communication discussed in FIGS. 2A and 2B above, the wireless devices 202, 208 perform a double-sided (e.g. dual) voice communication, in comparison to the single-sided voice communication discussed in FIG. 1.

Also for embodiments where the pressure sensors 204, 210 are external microphones located on either side of a person's head, the signal enhancement (e.g. beamforming) processing substantially reduces any environmental noise interference so that voice signal, such as human speech, voice commands, etc., can be more accurately understood (e.g. for speech recognition). Robustness to false voice communications is increased compared to single-sided voice communication, due to the noise reduction and beamforming of the pressure sensors' 204, 210 (e.g. external microphones') signals.

One advantage of the double-sided microphone approach is that the computationally intensive speech recognition algorithms need only be designed to run on a signal enhanced (e.g. cleaned-up, beamformed etc.) combination of both pressure sensors 204, 210.

Figure 3:
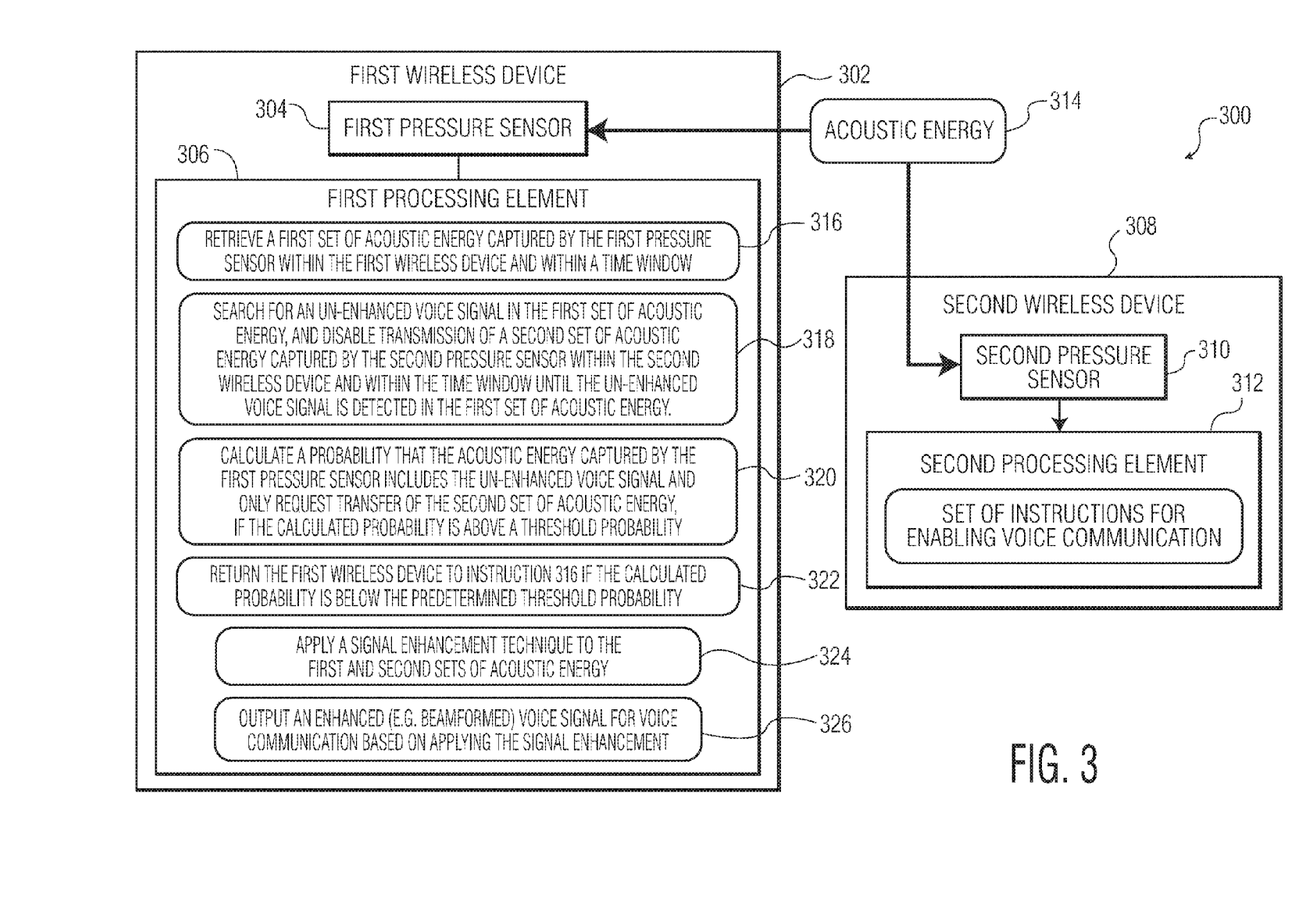
FIG. 3 is a third example apparatus for voice communication.

FIG. 3 is a third example 300 apparatus for voice communication. The third apparatus 300 includes: a first wireless device 302 having a first pressure sensor 304 and a first processing element 306; and a second wireless device 308 having a second pressure sensor 310 and a second processing element 312. Each pressure sensor 304, 310 captures acoustic energy 314 within a time window. The time window can be controlled by a clock signal synchronized between the devices 302, 308.

The third apparatus 300 however presents a modified version of the second example 200 apparatus (discussed above) which reduces the wireless devices' 302, 308 power consumption by canceling the second example 200 apparatus' instructions 218 through 232 (i.e. see the FIGS. 2A and 2B) and returning to the acoustic energy 314 capture mode (e.g. instruction 216) in certain circumstances.

In various example embodiments, one or both of the processing elements 306, 312 are configured with a set of instructions for enabling voice communication. The order in which these example instructions are presented can be changed or selectively excluded in different example embodiments. Additionally, in some example embodiments certain instructions are implemented in parallel.

A first instruction 316 retrieves a first set of acoustic energy captured by the first pressure sensor 304 within the first wireless device 302 and within a time window.

A second instruction 318 searches for an un-enhanced voice signal in the first set of acoustic energy, and disables transmission of a second set of acoustic energy captured by the second pressure sensor 310 within the second wireless device 308 and within the time window until the un-enhanced voice signal is detected in the first set of acoustic energy. A voice activity algorithm can be used to search for the un-enhanced voice signal in the first set of acoustic energy.

Thus in this embodiment, the second set of acoustic energy is not received by the first wireless device 302 until the first wireless device 302 requests transfer of the second set of acoustic energy. Also, the first wireless device 302 is configured to request transfer of the second set of acoustic energy only in response to the first processing element 306 detecting the un-enhanced voice signal in the first set of acoustic energy.

A third instruction 320 calculates a probability that the acoustic energy 314 captured by the first pressure sensor 304 includes the un-enhanced voice signal and only requests transfer of a second set of acoustic energy captured by the second pressure sensor 310 within the second wireless device 308 and within the time window, if the calculated probability is above a predetermined threshold probability. This instruction reduces power consumption for the wireless devices 302, 308 since the devices 302, 308 do not always need to be in communication and exchange data.

A fourth instruction 322 returns the first wireless device 302 to instruction 316 if the calculated probability is below the predetermined threshold probability.

A fifth instruction 324 applies a signal enhancement (e.g. beamforming) technique to the first and second sets of acoustic energy.

A sixth instruction 326 outputs an enhanced (e.g. beamformed) voice signal for voice communication based on applying the signal enhancement.

Thus power consumption in the third example 300 apparatus is reduced since the second set of acoustic energy captured by the second pressure sensor 310 within the second wireless device 308 is not always transferred to the first wireless device 302.

In one example embodiment, both wireless devices 302, 308 (e.g. left and right earbuds) are in a single-sided voice signal detection mode and receive the acoustic energy 314 independently on their own pressure sensor 304, 310 (e.g. external microphone), and each wireless device 302, 308 individually calculates a probability that the acoustic energy 314 contains the voice signal. In this example either wireless device 302, 308 can set up a NFMI connection and initiate the request to transfer the other wireless devices' set of captured acoustic energy.

In various example embodiments, the wireless devices 202, 208, 302, 308 can communicate using a variety of protocols, including Bluetooth Classic (BC), Bluetooth Low-Energy (BLE), WiFi or NFMI.

Also, the various instructions here presented need not all be implemented on just the wireless devices 202, 208, 302, 308. Alternatively, such instructions could be executed by transferring the requisite acoustic and/or other data to a third device or to a server for processing. Such embodiments would tend to induce latency which may or may not be acceptable, depending upon a particular example embodiment.

Note that the instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

Figure 4:
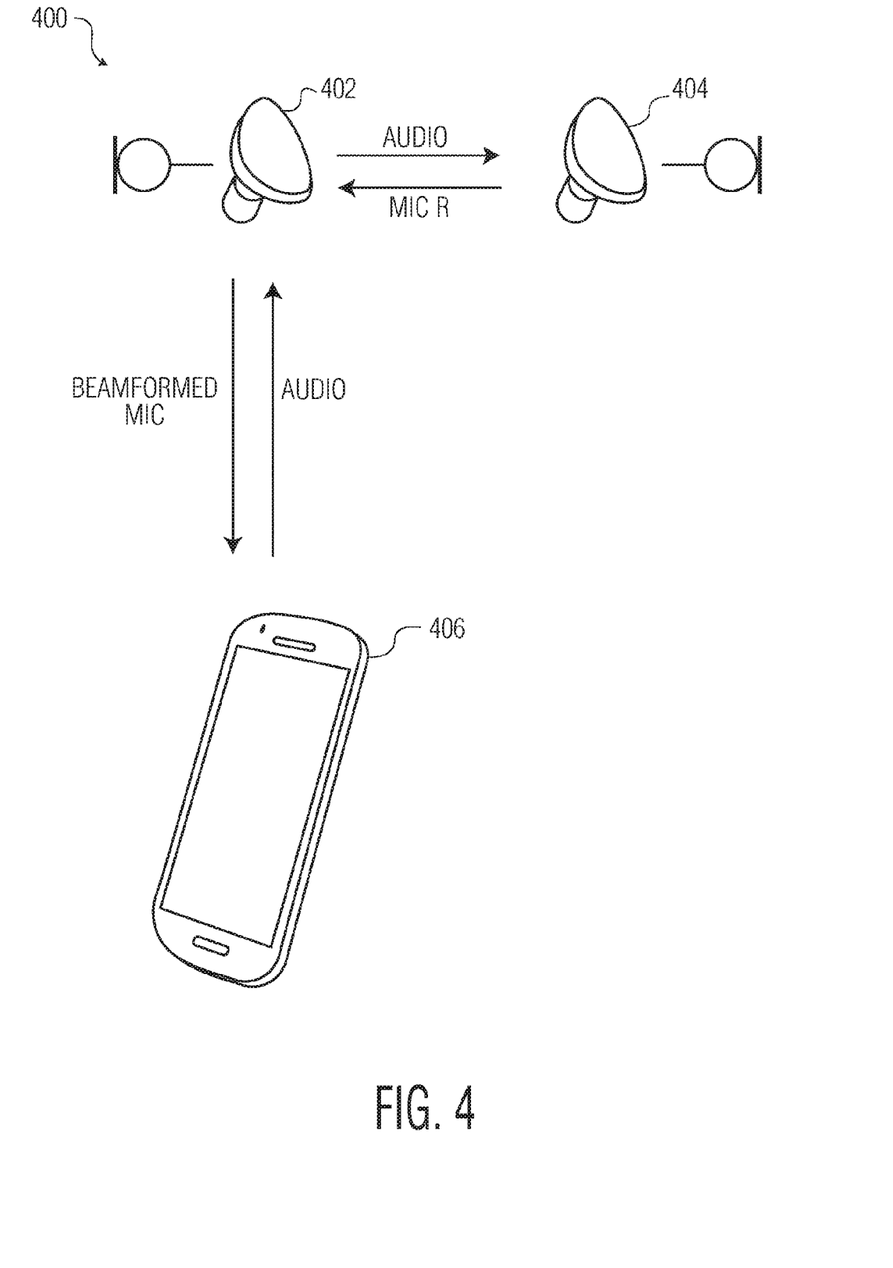
FIG. 4 is a first example system including either the second or third apparatus for voice communication.

FIG. 4 is a first example system 400 including either the second 200 or third 300 apparatus for voice communication. The system 400 includes a first wireless device 402 (e.g. left earbud), a second wireless device 404 (e.g. right earbud), and a third wireless device 406 (e.g. smartphone).

Here, the second wireless device 404 (e.g. right earbud) is equipped with a microphone and a wireless NFMI connection that is used to transport the right earbud's 404 microphone signal from the right earbud 404 to the first wireless device 402 (e.g. left earbud). As a result, the left earbud 402 can now use beamforming on both microphone signals to better pick up an earbud wearer's speech signals and to suppress any environment noise.

Figure 5:
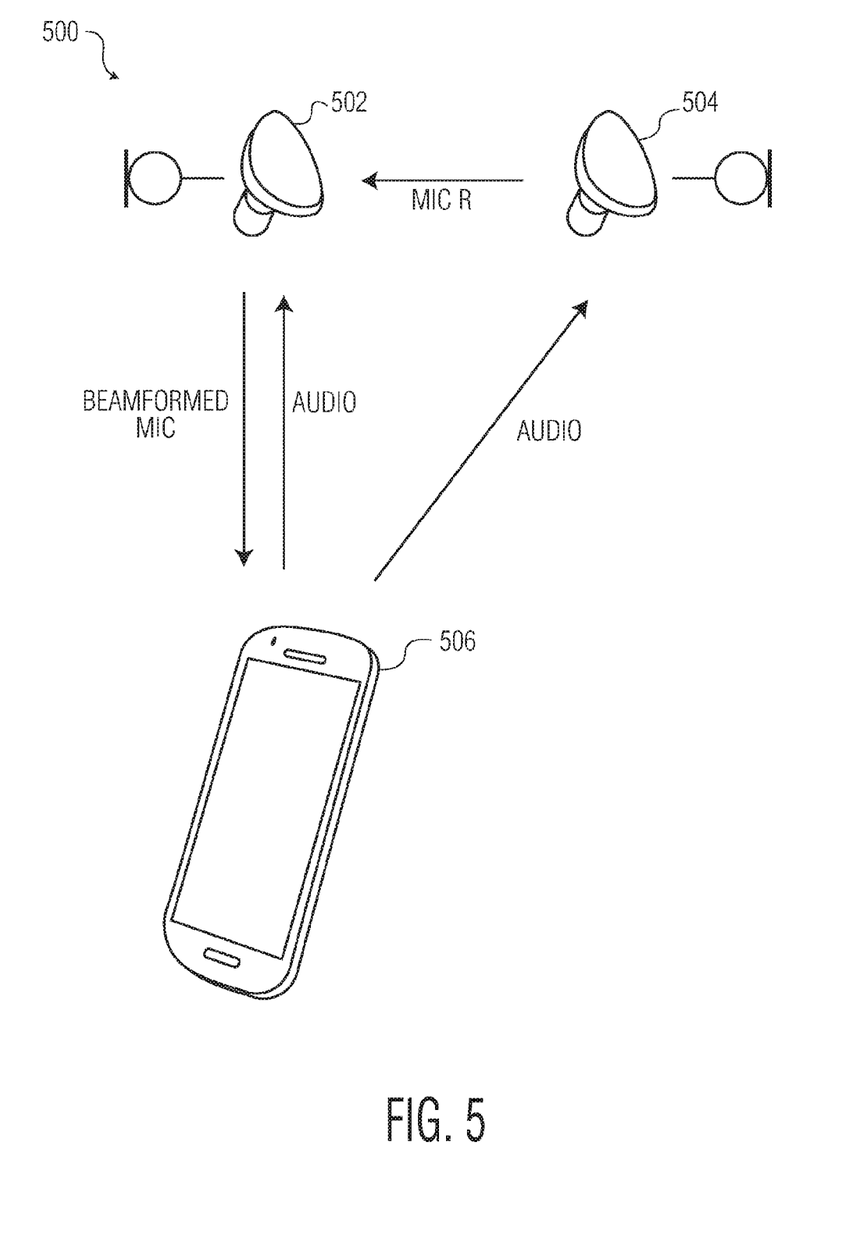
FIG. 5 is a second example system including either the second or third apparatus for voice communication.

FIG. 5 is a second example system 500 including either the second 200 or third 300 apparatus for voice communication. The system 500 includes a first wireless device 502 (e.g. left earbud), a second wireless device 504 (e.g. right earbud), and a third wireless device 506 (e.g. smartphone).

Here, as in FIG. 4, the second wireless device 504 (e.g. right earbud) is equipped with a microphone and a wireless NFMI connection that is used to transport the right earbud's 504 microphone signal from the right earbud 504 to the first wireless device 502 (e.g. left earbud). As a result, the left earbud 502 can now use beamforming on both microphone signals.

Alternatively, it would be possible with Bluetooth Low-Energy (BLE) to have both earbuds send their respective pressure sensor (e.g. microphone) signals directly to the smartphone 506 and have the smartphone 506 perform beamforming. This would avoid the use and cost overhead of each earbud 502, 504 having a set of circuitry for inter-communication (e.g. NFMI circuitry). However, as the smartphone 506 may not know the acoustic properties of each earbud 502, 504 and since the smartphone 506 would likely need to support multiple earbud vendors, the smartphone 506 will use a generic beamforming algorithm, which may not be tailored to the earbuds. This could lead to a lower voice sound quality and/or speech recognition, than what is possible with an earbud inter-communication based approach.

Note that the instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

Figure 6:
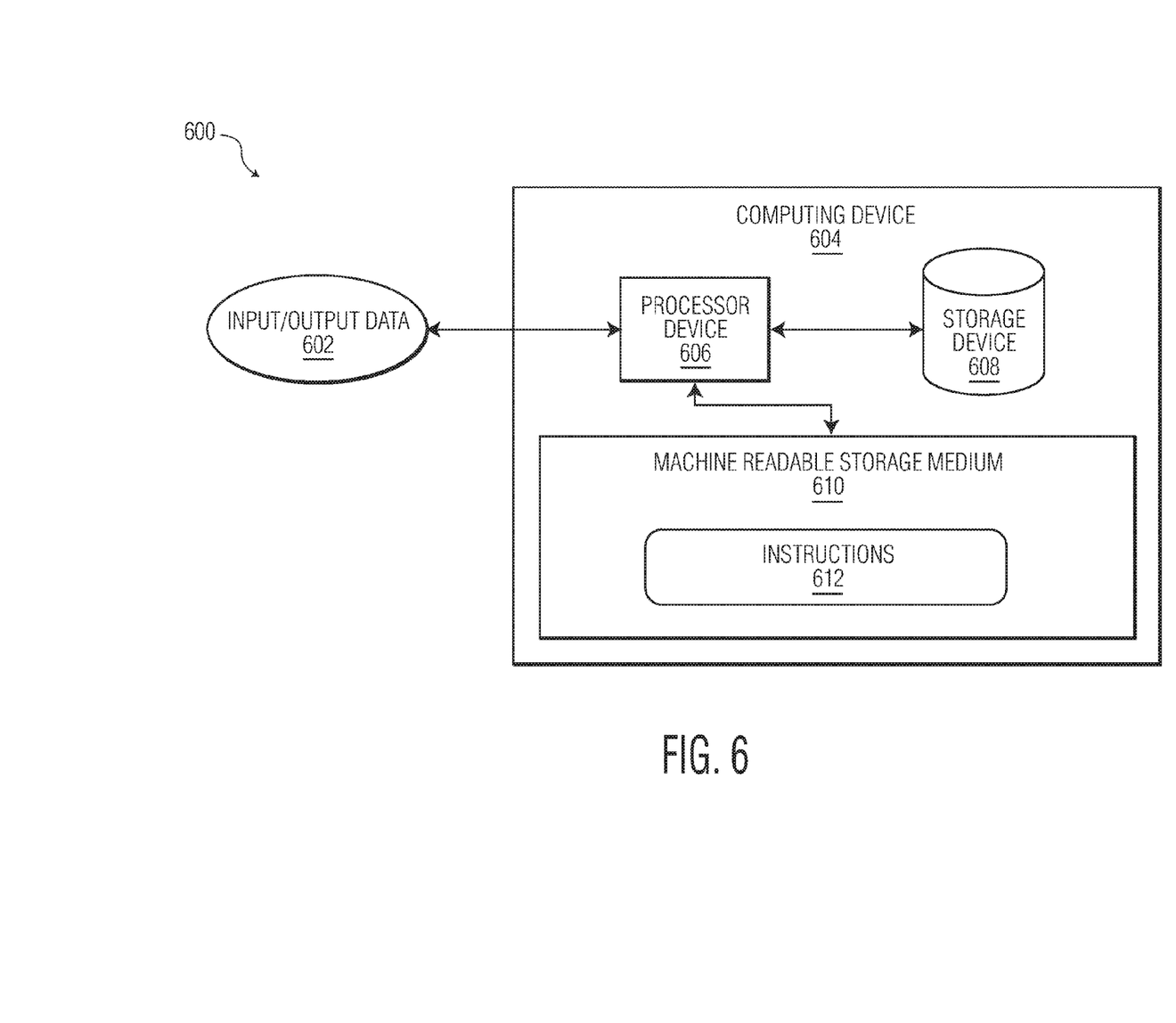
FIG. 6 is an example system for hosting the instructions within either the second or third apparatus for voice communication.

FIG. 6 is an example system for hosting the instructions within either the second or third apparatus for voice communication. The system 600 shows an input/output data 602 interface with an electronic apparatus 604. The electronic apparatus 604 includes a processor 606, a storage device 608, and a non-transient machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. Apparatus for voice communication, comprising:
   a first wireless device including a first pressure sensor having a first acoustical profile and configured to capture a first set of acoustic energy within a time window;
   wherein the first wireless device includes a near-field magnetic induction (NFMI) signal input;
   wherein the first wireless device includes a processing element configured to:
   receive, through the NFMI signal input, a second set of acoustic energy captured by a second pressure sensor, having a second acoustical profile, within a second wireless device and within the time window;
   apply a signal enhancement technique to the first and second sets of acoustic energy based on the first and second acoustical profiles; and
   output an enhanced voice signal based on applying the signal enhancement,
   wherein the second set of acoustic energy is not received by the first wireless device until the first wireless device requests transfer of the second set of acoustic energy from the second wireless device.

2. The apparatus of claim 1: wherein the signal enhancement technique is a beamforming technique.

3. The apparatus of claim 2: wherein the signal enhancement technique includes multiple beamforming operations targeted to individually isolate a set of voice signals; and
   wherein multiple enhanced voice signals are output based on the isolated set of different voice signals.

4. The apparatus of claim 1, wherein the processing element is further configured to:
   search for an un-enhanced voice signal in the first set of acoustic energy; and
   inactivate the receive, apply and output elements until the un-enhanced voice signal is detected in the first set of acoustic energy.

5. The apparatus of claim 1:
   wherein the first wireless device is configured to request transfer of the second set of acoustic energy in response to the processing element detecting an un-enhanced voice signal in the first set of acoustic energy.

6. The apparatus of claim 5, wherein the processing element is configured to:
   calculate a probability that the first set of acoustic energy received within the time window includes the un-enhanced voice signal and only request transfer of the second set of acoustic energy if the calculated probability is above a predetermined threshold probability.

7. The apparatus of claim 1: wherein a voice activity algorithm enables the search for the un-enhanced voice signal.

8. The apparatus of claim 1: further comprising the second wireless device; and
   wherein the second wireless device is configured to be separated from the first wireless device by a predetermined distance.

9. The apparatus of claim 8: wherein the set of wireless devices are configured to be separated by the predetermined distance within at least one of: an indoor environment, a home, an office, a subway, a vehicle, a car, a train, a plane, or an outdoor environment.

10. The apparatus of claim 1: wherein the wireless devices include at least one of: a microphone, a earbud, a hearable, a smartphone, a smartwatch, a wearable device, a tablet or a computer.

11. The apparatus of claim 1: wherein the processing element is configured to initiate a set of voice communication actions configured to analyze the enhanced voice signal for at least one of: a voice command, a set of words, or a voice signature.

12. The apparatus of claim 1: wherein the processing element is configured to initiate a set of voice communication actions configured to use the enhanced voice signal to perform at least one of: natural language processing, isolating a set of voice signals from within a larger set of voice signals, or improving a voice signal quality.

13. The apparatus of claim 12: wherein the processing element is configured to initiate a wireless connection to a voice signal processing server; and
    wherein the server performs the set of voice communication actions.

14. The apparatus of claim 1: wherein the first pressure sensor is configured to receive the acoustic energy via a passage coupling an internal portion of the wireless device to an external ambient environment.

15. An article of manufacture including at least one non-transitory, tangible machine readable storage medium containing executable machine instructions for voice communication:
    wherein the article includes, a wireless device including a pressure sensor, having a first acoustical profile, and configured to capture a first set of acoustic energy within a time window, and a processing element configured to execute the instructions; and wherein the instructions include, receiving, through an near-field magnetic induction (NFMI) signal input, a second set of acoustic energy captured by a second pressure sensor, having a second acoustical profile, within a second wireless device and within the time window;

applying a signal enhancement technique to the first and second sets of acoustic energy based on the first and second acoustical profiles; and outputting an enhanced voice signal based on applying the signal enhancement, wherein the second set of acoustic energy is not received by the first wireless device until the first wireless device requests transfer of the second set of acoustic energy from the second wireless device.

* * * * *